No. 816,363. PATENTED MAR. 27, 1906.
H. C. ODENKIRK.
CAR WHEEL.
APPLICATION FILED JAN. 26, 1906.
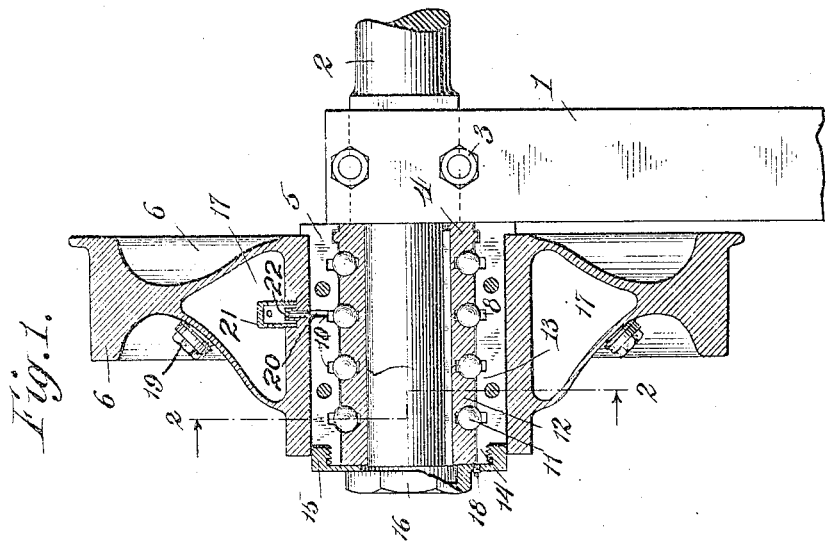
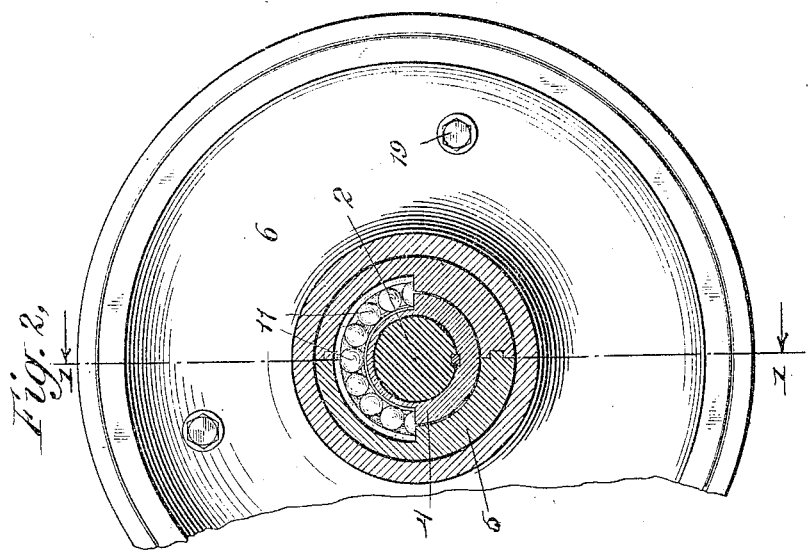
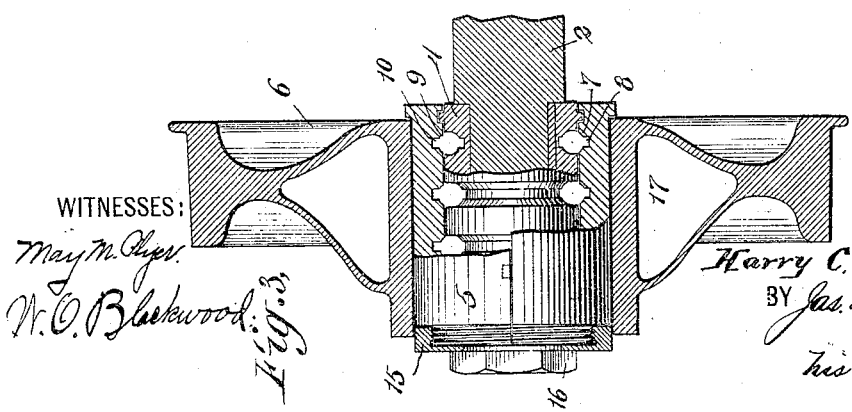
WITNESSES:
May M. Olyer
W. C. Blackwood
INVENTOR.
Harry C. Odenkirk
BY Jas. L. Skidmore
his ATTORNEY.

UNITED STATES PATENT OFFICE.

HARRY C. ODENKIRK, OF CLEVELAND, OHIO.

CAR-WHEEL.

No. 816,363.  Specification of Letters Patent.  Patented March 27, 1906.

Application filed January 26, 1906. Serial No. 298,008.

*To all whom it may concern:*

Be it known that I, HARRY C. ODENKIRK, a citizen of the United States, and a resident of Cleveland, State of Ohio, have invented certain new and useful Improvements in Car-Wheels, of which the following is a specification.

The present invention relates to a truck for railway-cars, and is more particularly directed to features of improvement in the wheels and in the manner of mounting them on the axles.

It is well known that in present railway-car construction the wheels are shrunk on the axles, the latter rotating in suitable bearings. In consequence of this when traveling on a curve the flange of the outer wheel and tread of the inner wheel and the inside of the outer rail and the crown of the inner rail become worn, thus necessitating the frequent renewal of wheels and rails. This wearing of the wheels and rails is due to the fact that the outer wheel must travel farther than the inner wheel when on a curve, the inner wheel at such time slipping on its rail, and to the resulting increased friction between the flange of the outer wheel and the side of the head of its rail and between the tread of the inner wheel and the crown of the head of its rail.

To obviate the objections incident to the present mode of construction and to prolong the life of both wheels and rails, I have devised the present wheel and the manner of its application to the axle, as will be clearly understood from the following description, taken in connection with the drawings, in which—

Figure 1 is a central horizontal section of my improved wheel, a portion of the axle and truck-frame being shown in plan view. Fig. 2 is a transverse vertical section on the plane of the line 2 2 of Fig. 1; and Fig. 3 is a central vertical section, certain of the parts being shown in elevation and broken away.

Similar reference-numerals indicate similar parts in the several views.

Referring to the drawings, the numeral 1 designates a portion of the truck-frame, to which frame the springs and bolster may be connected in the usual manner. The axle 2 is rigidly connected to the frame 1 by means of bolts 3, which may be arranged to extend through the frame 1 and through grooves formed upon the opposite sides of the axle 2. Any other suitable means for rigidly securing the axles to the frame may be adopted.

The wheels are constructed as follows: Each wheel comprises an inner sleeve 4, which is shrunk, keyed, or otherwise fixedly secured to the axle, an outer sleeve 5, and a tread-section 6. The sleeve 4 is preferably formed of a single piece of hardened steel, and in the outer face thereof are formed any desired number of parallel grooves 7, extending circumferentially of said sleeve. The grooves 7 are substantially V-shaped in section, the bottom of each groove being formed as shown to constitute a duct 8 to receive the lubricant. Surrounding the sleeve 4 is the outer sectional sleeve 5, also of hardened steel, upon the inner face of which are formed substantially V-shaped grooves 9, corresponding in number to the grooves 7 of the sleeve 4. The bottoms of the grooves 9 also constitute ducts 10 to receive the lubricant. The complemental grooves 7 and 9 when the parts are assembled constitute raceways adapted to receive steel balls 11, said balls bearing upon the inclined side walls of the ribs 12 and 13 between the grooves 7 and 9, respectively.

The sleeve 5 is preferably formed in two sections, the outer ends of which are reduced to form a boss 14, which is exteriorly screw-threaded to receive a cap 15, the latter being formed with a head 16 to accommodate a wrench for attaching and detaching the cap.

The tread-section 6 may be of usual design adapted to any existing commercial type of rail. The interior hollow portion 17 may, if desired, be utilized for the purpose hereinafter described.

When assembling a wheel having the parts above described, the inner sleeve 4 is shrunk or otherwise fixedly secured to the axle 2. The ducts 8 and 10 may then be filled with a suitable lubricant and the grooves 7 of the two sections of the outer sleeve 5 filled with steel balls 11. The two sections of said outer sleeve are then placed about the inner sleeve 4, the balls 11 then occupying the raceways, care being taken that the parts be properly adjusted so that grooves 7 and 9 are symmetrically disposed or come directly opposite each other. The depth of the grooves 7 and 9 is such that when the two sections of the outer sleeve are brought together there will be a slight space between the two sleeves 4 and 5, as indicated in the drawings, the balls 11 preventing contact between the sleeves. The cap 15 is then secured in place by screwing it onto the boss 14. The tread-section 6 is then shrunk on or otherwise rigidly fixed to the outer sleeve 5. To complete the assemblage for a truck, the axle 2 is rigidly connected to the frame 1, as above described, so that said axle and the sleeve 4 will be held against rotation. The balls 11, outer sleeve 5, and the tread-section 6 are the only parts which revolve when the truck is in motion.

The balls 11 bear against the side walls of the grooves 7 and 9, and in practice the balls are of such diameter and the depths of the grooves or the points of contact of the balls with the sleeves so proportioned as to maintain the sleeves 4 and 5 a uniform distance apart throughout their opposing faces and the balls themselves in contact with each other in a given raceway. A free bearing-surface is thus provided for the tread-section and the latter permitted to revolve freely about the fixed axle with a minimum of frictional resistance. By this improvement journal-boxes with their accompanying brasses, wedges, waste, and oil are dispensed with and the wear of rails and wheels, especially on curves, entirely obviated or at least reduced to a minimum.

The lubricant placed in the ducts 8 and 10 at the time of assemblage of the wheel will be found sufficient to serve for a considerable length of time, when it may be replenished by injecting it through an opening in the cap 15 in alinement with the space between the sleeves 4 and 5. Said opening may be closed by a screw-plug 18, as indicated in Fig. 1. The lubricant will gradually work its way to all the raceways. Should it be desired, however, to equip the wheel with means for automatically supplying a lubricant to the ball-bearing, it may be done as follows: The interior hollow portion 17 of the tread-section 6 may be utilized for containing oil or other lubricant, access to said interior being gained through plugs or stoppers 19. Any suitable number of these plugs may be provided in order that one may be at the upper portion of the wheel when the car is not in motion in order that the lubricant may be inserted therethrough. To secure a positive feed of the lubricant to the raceways, any suitable number of ducts 20 are formed in the sections of the sleeve 5, said ducts leading from the chamber 17 to the raceways. A perforated cap 21 is seated in a threaded socket in the inner web of the tread-section 6, and a small plunger 22 extends into the duct 20, the head of said plunger being of sufficient weight to cause the plunger to reciprocate by gravity to convey a small quantity of the oil or other lubricant from the recess 17 to the raceways at each revolution of the wheel.

When the plunger 22 is at the bottom of the wheel, it is withdrawn a slight extent from the oil-duct 20 by gravity. When the plunger is at the top of the wheel, it pushes a small quantity of the lubricant through the duct 20 into the raceway. An opening may be formed in the outer web of the wheel to admit the cap 21 and the plunger 22, and such opening may be closed by a threaded plug similar to 19.

Any desired number of raceways may be utilized, there being four shown in the drawings, that number being found in practice to be sufficient for very heavy loads.

What I claim, and desire to secure by Letters Patent, is—

1. The combination of an axle adapted to be mounted in bearings against rotation, a sleeve rigidly secured to said axle, an outer sleeve surrounding said axle-sleeve, the opposing faces of said sleeves being provided with complemental grooves to form raceways, balls supported in said raceways, and a tread-section rigidly secured to said outer sleeve.

2. The combination of an axle adapted to be mounted in bearings against rotation, a sleeve rigidly secured to said axle, an outer sleeve surrounding said axle-sleeve, the opposing faces of said sleeves being provided with complemental grooves to form raceways, balls supported in said raceways, the depth of said grooves and the diameter of the balls being such as to maintain said sleeves a uniform distance apart throughout their opposing faces, and a tread-section rigidly secured to said outer sleeve.

3. The combination of an axle adapted to be mounted in bearings against rotation, a sleeve rigidly secured to said axle, an outer sleeve surrounding said axle-sleeve, the opposing faces of said sleeves being provided with complemental grooves to form raceways, said grooves being substantially V-shaped in section and the bottoms thereof constituting ducts to receive a lubricant, balls supported in said raceways, and a tread rigidly secured to said outer sleeve.

4. The combination of an axle adapted to be mounted in bearings against rotation, an inner sleeve of a single piece of hardened steel shrunk on said axle, an outer sectional sleeve surrounding but not in bearing contact with said axle-sleeve, the opposing faces of said sleeves being provided with complemental grooves to form raceways, balls supported in said raceways, and a tread-section rigidly secured to said outer sleeve.

5. The combination of an axle adapted to be mounted in bearings against rotation, a sleeve rigidly secured to said axle, an outer sleeve surrounding said axle-sleeve, the opposing faces of said sleeves being provided with complemental grooves to form raceways, balls supported in said raceways, said outer sleeve being in sections the outer ends of which are reduced and exteriorly screw-threaded to receive a cap, and a tread-section rigidly secured to said outer sleeve.

6. The combination of an axle adapted to be mounted in bearings against rotation, a sleeve rigidly secured to said axle, an outer sleeve surrounding said axle-sleeve, the opposing faces of said sleeves being provided with complemental grooves to form raceways, balls supported in said raceways, a tread-section rigidly secured to said outer sleeve, and means for supplying a lubricant to said raceways.

In testimony whereof I have hereunto signed my name in the presence of two subscribing witnesses.

HARRY C. ODENKIRK.

Witnesses:
M. MILLARD,
J. H. MARKELL.